US009262921B2

(12) United States Patent
Proux

(10) Patent No.: US 9,262,921 B2
(45) Date of Patent: Feb. 16, 2016

(54) ROUTE COMPUTATION FOR NAVIGATION SYSTEM USING DATA EXCHANGED WITH TICKET VENDING MACHINES

(71) Applicant: Xerox Corporation, Norwalk, CT (US)

(72) Inventor: Denys Proux, Vif (FR)

(73) Assignee: XEROX CORPORATION, Norwalk, CT (US)

( * ) Notice: Subject to any disclaimer, the term of this patent is extended or adjusted under 35 U.S.C. 154(b) by 277 days.

(21) Appl. No.: 13/898,883

(22) Filed: May 21, 2013

(65) Prior Publication Data

US 2014/0350853 A1  Nov. 27, 2014

(51) Int. Cl.
*G01C 21/34* (2006.01)
*G08G 1/123* (2006.01)
*G08G 1/14* (2006.01)
*G01C 21/36* (2006.01)
*G08G 1/0967* (2006.01)

(52) U.S. Cl.
CPC  *G08G 1/14* (2013.01); *G01C 21/34* (2013.01); *G01C 21/36* (2013.01); *G01C 21/3679* (2013.01); *G01C 21/3685* (2013.01); *G08G 1/096716* (2013.01); *G08G 1/096741* (2013.01); *G08G 1/096783* (2013.01); *G08G 1/143* (2013.01); *G08G 1/144* (2013.01); *G08G 1/147* (2013.01); *G08G 1/148* (2013.01); *G01C 21/3492* (2013.01)

(58) Field of Classification Search
CPC .................................................. G01C 21/3685
See application file for complete search history.

(56) References Cited

U.S. PATENT DOCUMENTS 4,971,505 A   11/1990  Sawyer
5,432,508 A    7/1995  Jackson
6,285,297 B1   9/2001  Ball
(Continued)

FOREIGN PATENT DOCUMENTS

DE    10 2006 041360 A1    3/2008

OTHER PUBLICATIONS

Basu, et al., "Networked Parking Spaces: Architecure and Applications," VTC 2002-FALL, 2002 IEEE 56th Vehicular Technology Conference Proceedings, vol. 2 (24) pp. 1153-1157 (2002).

(Continued)

*Primary Examiner* — Yonel Beaulieu
*Assistant Examiner* — Lail Kleinman
(74) *Attorney, Agent, or Firm* — Fay Sharpe LLP

(57) ABSTRACT

A method for assisting a driver to locate a parking space includes identifying a user-selected destination with a navigation system of a first vehicle. While the driver of the first vehicle is being guided by the navigation system towards the selected destination, parking availability information is acquired from a first space allocation device (e.g., ticket vending machine), associated with a first parking zone. The parking availability information includes parking availability information for at least one second parking zone associated with a respective second, space allocation device, remote from the first space allocation device. The second parking availability information for the second parking zone(s) is communicated to the first space allocation device by at a respective second navigation system of at least one second vehicle. A parking zone is selected, based on the user-selected destination and acquired parking availability information transmitted from the first space allocation device.

20 Claims, 8 Drawing Sheets

(56) References Cited

U.S. PATENT DOCUMENTS

| | | |
|---|---|---|
| 6,671,737 B1 | 12/2003 | Snowdon et al. |
| 7,116,246 B2 | 10/2006 | Winter et al. |
| 7,492,283 B1 | 2/2009 | Racunas, Jr. |
| 7,647,185 B2 | 1/2010 | Tarassenko et al. |
| 7,889,099 B2 | 2/2011 | Aubrey et al. |
| 2007/0040701 A1* | 2/2007 | Browne et al. ............. 340/932.2 |
| 2009/0171567 A1* | 7/2009 | Morimoto et al. ............ 701/204 |
| 2012/0161984 A1 | 6/2012 | Eyal |

OTHER PUBLICATIONS

Panayappan, et al., "VANET-based Approach for Parking Space Availability," Proc. 4$^{th}$ International Workshop on Vehicular AD HOC Networks, p. 76 (2007).

Glance, et al. "Pollen: Virtual Networks That Use People as Carriers" Proc. Handheld and Ubiquitous Computing, First Intl. Symposium (HUC'99), Sep. 27-29, 1999, pp. 362-364.

U.S. Appl. No. 13/438,313, filed Apr. 3, 2012, Grbovic, et al.

U.S. Appl. No. 13/441,294, filed Apr. 6, 2012, Bernal, et al.

U.S. Appl. No. 13/441,253, filed Apr. 6, 2012, Bulan, et al.

U.S. Appl. No. 13/441,269, filed Apr. 6, 2012, Bulan, et al.

U.S. Appl. No. 13/461,191, filed May 1, 2012, Fan, et al.

U.S. Appl. No. 13/684,817, filed Nov. 26, 2012, Rong, et al.

U.S. Appl. No. 13/740,380, filed Jan. 14, 2013, Roux, et al.

U.S. Appl. No. 13/836,310, filed Mar. 15, 2013, Wu, et al.

\* cited by examiner

ROUTE COMPUTATION FOR NAVIGATION SYSTEM USING DATA EXCHANGED WITH TICKET VENDING MACHINES

BACKGROUND

The exemplary embodiment relates to identification of available locations and finds particular application in connection with a system and method for alerting a vehicle driver as to the locations of available parking spaces near a selected destination.

Navigation systems for vehicle drivers are now widely used due to the development of the Global Positioning System and applications able to compute a route from a local position to a selected destination. These systems are often able to propose alternate routes depending on user preferences and traffic conditions. If the driver wishes to park the vehicle upon reaching the destination, the driver will often search for a parking space at the destination and, if none is available, search nearby streets for an available parking space. This can be time consuming, especially when the driver is unfamiliar with the area and the parking spaces are mostly occupied. One solution is to employ an advanced navigation system to identify the closest parking location. However, such systems usually only have information on large public parking garages and parking lots which may be far from the selected destination.

There remains a need for a system and method which assist a driver in locating an available parking space which is close to the selected destination.

INCORPORATION BY REFERENCE

The following references, the disclosures of which are incorporated herein by reference in their entireties, are mentioned:

U.S. Pat. No. 5,432,508, issued Jul. 11, 1995, entitled TECHNIQUE FOR FACILITATING AND MONITORING VEHICLE PARKING, by Jackson; U.S. Pat. No. 6,285,297, issued Sep. 4, 2001, entitled DETERMINING THE AVAILABILITY OF PARKING SPACES, by Ball; U.S. Pat. No. 6,344,806, issued Feb. 5, 2002, entitled PARKING STATUS CONTROL SYSTEM AND METHOD, by Katz; U.S. Pat. No. 6,671,737, issued Dec. 30, 2003, entitled DECENTRALIZED NETWORK SYSTEM, by Snowdon, et al.; U.S. Pat. No. 7,116,246, issued Oct. 3, 2006, entitled APPARATUS AND METHOD FOR SENSING THE OCCUPANCY STATUS OF PARKING SPACES IN A PARKING LOT, by Winter, et al.; U.S. Pat. No. 7,492,283, issued Feb. 17, 2009, entitled SYSTEMS AND METHODS FOR COMMUNICATION OF PARKING INFORMATION, by Racunas, Jr.; U.S. Pat. No. 7,647,185, issued Jan. 12, 2010, entitled APPARATUS AND METHOD FOR SENSING THE OCCUPANCY STATUS OF PARKING SPACES IN A PARKING LOT, by Tarassenko, et al.; U.S. Pat. No. 7,889,099, issued Feb. 15, 2011, entitled PARKING-ZONE MANAGEMENT SYSTEM, by Aubrey, et al.; U.S. Pat. No. 4,971,505, issued Nov. 20, 1990, entitled ARCHITECTURAL STRUCTURE FOR OCCUPANCY AND PARKING, by Sawyer; U.S. Pub. No. 20130262059, published Oct. 3, 2013, entitled MODEL FOR USE OF DATA STREAMS OF OCCUPANCY THAT ARE SUSCEPTIBLE TO MISSING DATA, by Mihajlo Grbovic, et al.; U.S. Pub. No. 20130265423, published Oct. 10, 2013, entitled VIDEO-BASED DETECTOR AND NOTIFIER FOR SHORT-TERM PARKING VIOLATION ENFORCEMENT, by Bernal, et al.; U.S. Pub. No. 20130266185, published Oct. 10, 2013, entitled VIDEO-BASED SYSTEM AND METHOD FOR DETECTING EXCLUSION ZONE INFRACTIONS, by Bulan, et al.; U.S. Pub. No. 20130265419, published Oct. 10, 2013, entitled SYSTEM AND METHOD FOR AVAILABLE PARKING SPACE ESTIMATION FOR MULTISPACE ON-STREET PARKING, by Bulan, et al.; U.S. Pub. No. 20130266190, published Oct. 10, 2013, entitled SYSTEM AND METHOD FOR STREET-PARKING-VEHICLE IDENTIFICATION THROUGH LICENSE PLATE CAPTURING, by Wang, et al. U.S. Pub. No. 20140145862, published May 29, 2014, entitled SYSTEM AND METHOD FOR ESTIMATION OF AVAILABLE PARKING SPACE THROUGH INTERSECTION TRAFFIC COUNTING, by Wang, et al.; U.S. Pub. No. 20140201066, published Jul. 17, 2014, entitled SYSTEM AND METHOD FOR ENABLING TRANSACTIONS ON AN ASSOCIATED NETWORK, by Pascal Roux, et al.; and U.S. Pub. No. 20140270381, filed published Sep. 18, 2014, entitled METHODS AND SYSTEM FOR AUTOMATED IN-FIELD HIERARCHICAL TRAINING OF A VEHICLE DETECTION SYSTEM, by Wu, et al.

BRIEF DESCRIPTION

In accordance with one aspect of the exemplary embodiment, a method for assisting a driver to locate a parking space includes, with a first navigation system of a first vehicle, identifying a user-selected destination. While a driver of the first vehicle is being guided by the navigation system towards the user-selected destination, parking availability information is acquired from a first space allocation device associated with a first parking zone. The parking availability information including second parking availability information for at least one second parking zone associated with a respective second space allocation device that is spaced from the first space allocation device, wherein the second parking availability information for the at least one second parking zone is communicated to the first space allocation device by at least one second navigation system of a respective second vehicle. With a processor, one of the at least one second parking zones is selected, based on the user-selected destination and acquired parking availability information.

In accordance with another aspect a navigation system includes a navigation component which identifies a route to a user-selected destination. A parking availability information component acquires parking availability information from a first space allocation device associated with a first parking zone, the parking availability information including second parking availability information for at least one second parking zone associated with a respective second space allocation device that is spaced from the first space allocation device. The second parking availability information for the at least one second parking zone is communicated to the first space allocation device by at least one second navigation system. A parking space location component identifies a parking zone to park, based on the acquired parking availability information and the user-selected destination. The navigation component is configured for identifying a route to the identified parking zone.

In accordance with another aspect, a ticket vending machine includes a mechanism for authorizing use of parking spaces in an associated first parking zone to vehicles for a predetermined time period. Memory stores, for a plurality of the parking spaces, information on the time at which one of the parking spaces in the first zone is allocated and the length of time allocated. A parking space computation component generates first parking availability information for the first parking zone based on the stored information on the time when one of the parking spaces in the first zone is allocated, the length of time allocated, and the current time. A first communication device transmits and receives parking availability information. An acquisition component acquires second parking availability information from the first communication device for at least one second parking zone and stores it in memory, the second parking availability information for the at least one second parking zone being communicated to the ticket vending machine by a second communication device of a first passing vehicle. The first communication device configured for transmitting the first and second parking availability information to a second communication device of a second passing vehicle for identifying a route to a parking zone based at least in part on the second parking availability information. A processor implements the acquisition component and parking space computation component.

In accordance with another aspect, a method for operating a ticket vending machine includes authorizing use of parking spaces in an associated first parking zone to vehicles for a predetermined time period. The method further includes storing, for a plurality of the parking spaces, information on the time at which one of the parking spaces in the first zone is allocated and the length of time allocated. First parking availability information is generated for the first parking zone based on the stored information on the time when one of the parking spaces in the first zone is allocated, the length of time allocated, and the current time. Second parking availability information is acquired for at least one second parking zone from a first passing vehicle, the second parking availability information for the at least one second parking zone having been communicated by a second ticket vending machine to the first passing vehicle. The first and second parking availability information is transmitted to a second communication device of a second passing vehicle for identifying a route to a parking zone based at least in part on the second parking availability information. A processor implements one or more steps of the method.

DETAILED DESCRIPTION

Figure 1:
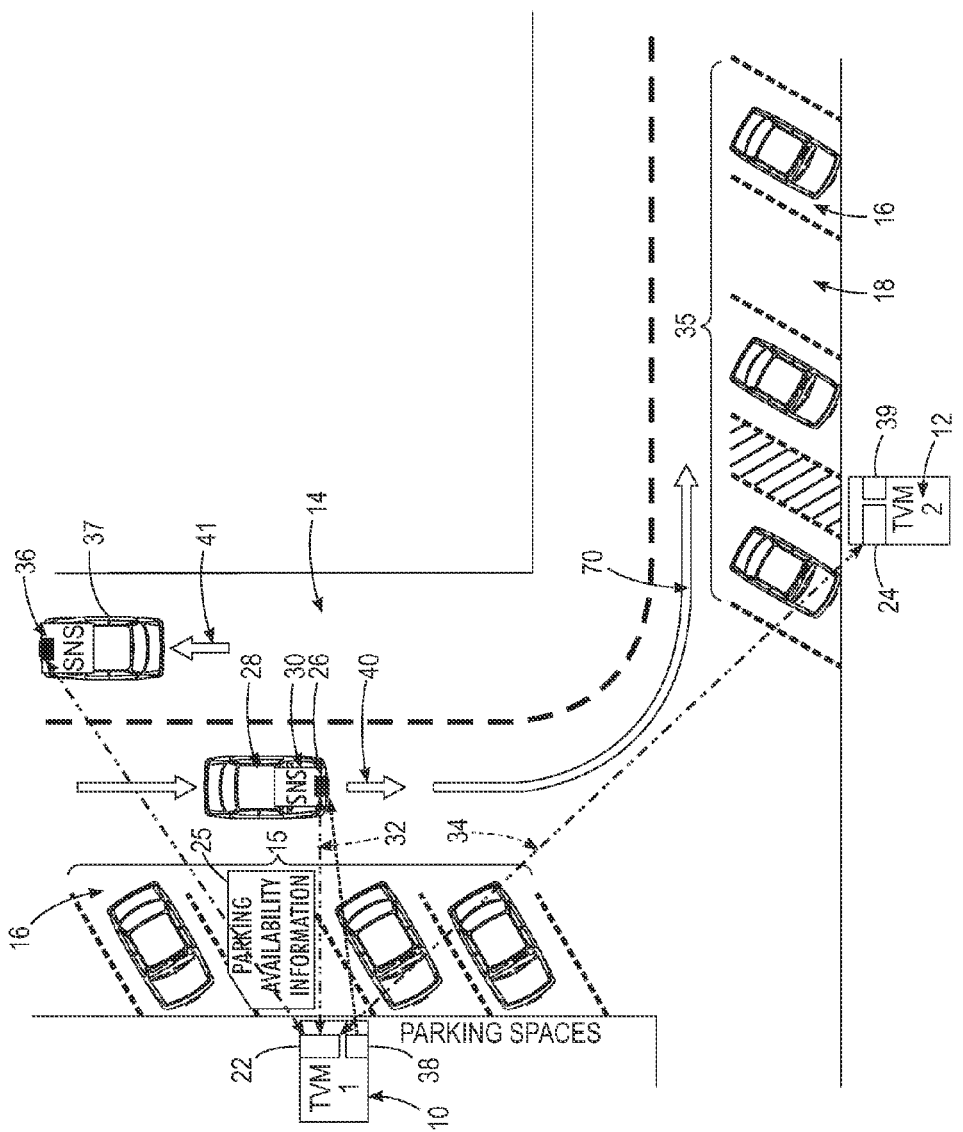
FIG. 1 is a schematic view of a system for assisting a driver in locating an available geographic location, such as a parking space in accordance with one aspect of the exemplary embodiment.

With reference to FIG. 1, a system for assisting a driver to locate an available location, such as a parking space for a vehicle, is illustrated. The exemplary embodiment is described in connection with on-street parking, however it is also applicable to parking lots and parking garages that are adjacent to public roads traveled by motorists.

The system includes a plurality of space allocation devices 10, 12, etc., such as ticket vending machines (TVMs), that are spaced throughout a transportation network 14 of a geographical region, such as a network of roads in a town, city, or larger region. Each TVM 10, 12 is associated with a respective parking zone 15, which includes a set of one, two, or more parking spaces 16, 18 that the respective TVM manages, i.e., which it can allocate to vehicles, such as cars and motorcycles. In general a TVM manages at least two and sometimes up to 50 or more parking spaces. The zone may correspond to, for example, one side of a street with marked parking spaces, a few marked parking spaces around an intersection, or a small parking lot with marked parking spaces that is located adjacent to/accessible from a street. At any time zero, one or more of the parking spaces 16 in the zone 15 may be occupied and zero, one or more of the parking spaces 18 may be empty (unoccupied). Each of the parking spaces 16, 18 is sized to accommodate a respective wheeled, motorized vehicle 20. Each TVM 10, 12 includes a computer-implemented mechanism for authorizing parking spaces in an associated zone to vehicles for a predetermined time period. Specifically, vehicle drivers who park their vehicles in one of the empty parking spaces are expected to obtain the right to park in the parking space for a finite period of time. This is obtained using the TVM 10, 12 associated with the parking space, for example by purchasing a parking ticket, presenting a multiuse card, or the like. In one embodiment, the vehicle is parked in any of the available parking spaces shortly before the ticket is obtained.

Each TVM 10, 12 includes a respective first communication device 22, 24 which is capable of communicating parking availability information 25 with a second communication device 26 carried by a passing vehicle 28 to help the driver determine where an available parking space is likely to be found. The second communication device 26 may be integral with or associated with a navigation system such as a satellite navigation system (SNS) 30, which is on board the vehicle 28. The communication devices may use Bluetooth, Wi-Fi, or other short range wireless technology for exchanging data over short distances (e.g., using short-wavelength radio transmissions in the 2400-2480 MHz range, in the case of Bluetooth or 2.4 or 5 GHz band in the case of Wi-Fi.

The first communication device 22 of a one TVM 10 may also be capable of communicating with a first communication device 24 of one or more other local TVMs 12 to provide and/or obtain parking space availability information 25 from local TVMs 12. However, such a communication network may be costly to implement and is not needed where each of a plurality of analogous SNS is configured to provide previously-acquired information 25 to the TVM 10 as it passes by. Communication may be via wireless electromagnetic signals 32, 34 at different frequencies. As will be appreciated, while FIG. 1 illustrates only two TVMs 10, 12, there may be many more TVMs spaced around a geographical region, such as 5, 10, 20 or more, each associated with respective parking spaces. In the exemplary embodiment, each TVM communicates only with local TVMs and/or passing SNS, i.e., with fewer than all the TVMs in a parking system. In one embodiment, the TVM acquires parking space availability information 25 for zones that are associated with other TVMs exclusively from passing SNSs and not directly from the TVMs.

The wireless network 32 allows the exemplary TVM 10 to communicate with an SNS 30 passing by. In particular, the first communication device 22 includes an antenna 104 for sending and receiving signals to/from the SNS second communication device 26. Optionally, the first communication device 22 (or a separate, analogous communication device) is also configured for sending and receiving signals to/from first communication devices of other, local TVMs 12.

In the illustrated embodiment, the SNS 30 acquires parking availability information 25 from a first TVM 10 associated with a first parking zone 15. The acquired information 25 includes first parking availability information generated for the first parking zone 15 that is associated with the TVM 12 as well as second parking availability information generated for a second parking zone 35 that is associated with a second TVM 12, together with a respective timestamp at which the first and second parking availability information was generated. The second TVM 12 is spaced from the first TVM 10 and manages an entirely different set of parking spaces. The second parking availability information for the second parking zone 35, generated earlier by the second TVM 12, is communicated to the first TVM 10 by a second navigation system 36 of a second vehicle 37 as it passes by the first TVM 10. The second navigation system 36 may have acquired the second parking availability information for the second parking zone 35 directly from the second TVM 12 as the second vehicle 37 passed by the second TVM 12 some minutes earlier, or may have acquired the second parking availability information for the second parking zone 35 from a third TVM (not shown), which in turn received the information from a third passing SNS, and so forth. In this way, a first TVM may acquire parking availability information from one two or more second TVMs 12 that are closer to the selected destination than is the first TVM 10. The information 25 acquired from the first TVM 10 further includes information identifying the respective locations of the respective first and second TVMs 10, 12, such as their GPS locations. This location information allows the SNS 28 to identify the locations of parking zones of second TVMs 12, if any, that are close to the destination and that are predicted to have available spaces 18. Additionally, the location information is provided by the SNS to other TVMs that it subsequently passes, so that they in turn, may provide the location information to other passing SNSs. The second parking availability information may include a number of unexpired parking tickets at a timestamp when the second TVM generated the information and the total number of parking spaces (occupied and unoccupied) in the second parking zone, or an estimate of parking space availability based thereon.

The navigation system 30 detects when is proximate a TVM 10, 12 (or vice versa). In one embodiment, each TVM 10, 12 may include a respective motion sensor 38, 39 for detecting the presence of a passing vehicle 28, 35 and its respective direction of travel 40, 41. In one embodiment, the motion sensor 32, 34 sends out microwave pulses and detects the reflection off the moving vehicle, analogous to a radar gun. Sensors employing ultrasonic waves or other electromagnetic waves or a passive sensor, such as a heat detector, or a tomographic sensor that senses disturbances to radio waves may alternatively be used. The TVM may then alert the SNS that it is close to a TVM. In another embodiment, the TVM outputs a continuous or repeated signal that is received by the SNS only when it is close to the TVM to alert the SNS 30 that it is close to a TVM. The SNS then requests the parking availability information 25 from the TVM. Other methods of detecting that the SNS is close enough to the TVM for communication of parking availability information are also contemplated.

The TVM 10, 12 may use the direction of travel information to identify to the SNS that there are second TVMs 12 that are in the direction of travel of the vehicle.

In one embodiment, the SNS 30 provides the TVM 10, 12 with the user-selected destination. The TVM stores this information and then, if a later-arriving SNS indicates the same destination as its own user-selected destination, the TVM may modify the parking availability information provided to the later arriving SNS to account for the likelihood that there will be fewer available parking spaces on the assumption the first vehicle is expected to arrive first at a parking zone close to the destination. If multiple SNS indicate the same destination, the TVM may alert a later-arriving SNS that parking availability in parking zones close to the destination may already be occupied by the time the respective vehicle reaches them.

Figure 2:
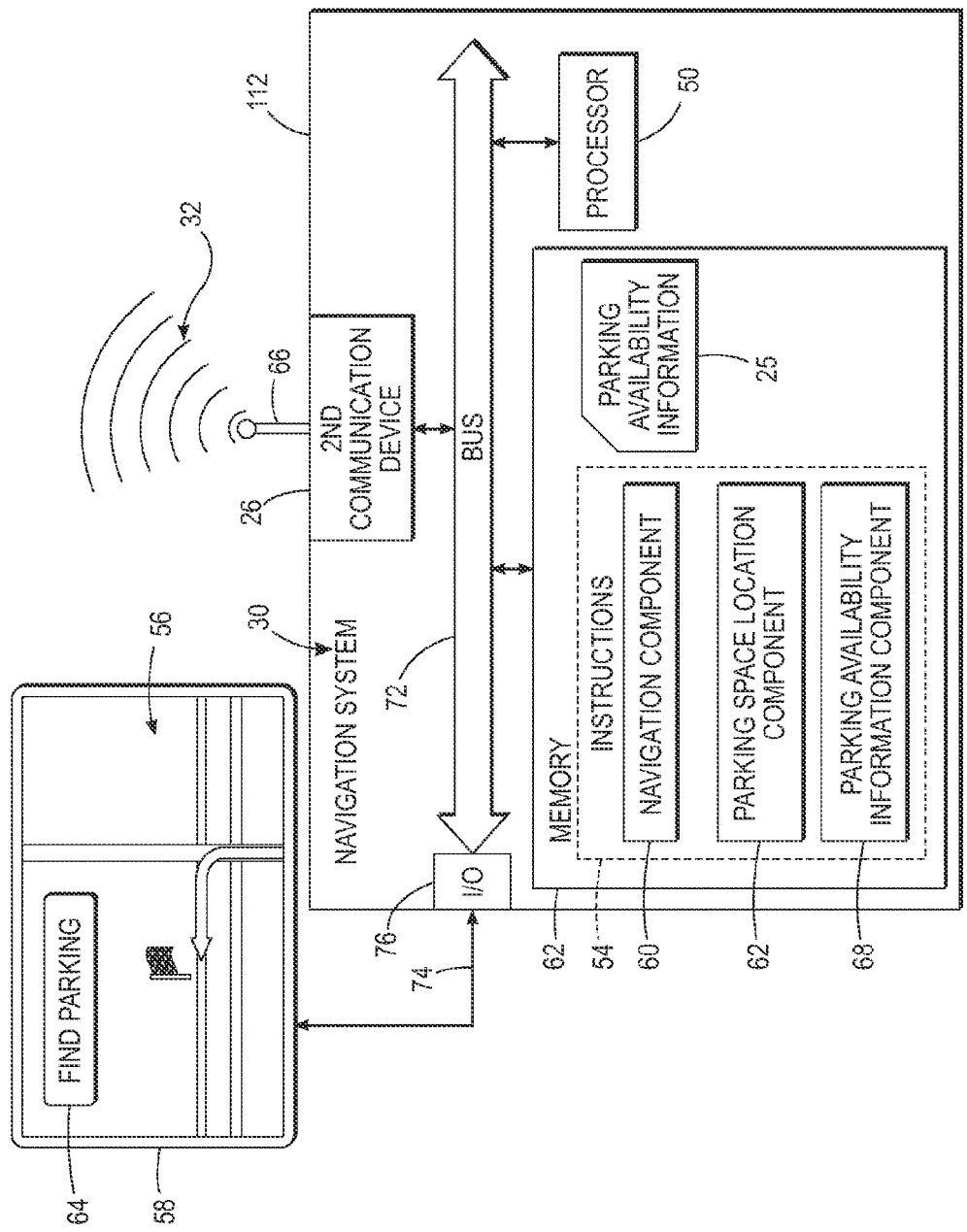
FIG. 2 is a functional block diagram of an onboard navigation system in the parking assist system of FIG. 1.

As illustrated in FIG. 2, the first navigation system 30 (and analogously the second navigation system 36) includes a processor 50, and associated memory 52 which stores instructions 54, executed by the processor, for generating a user interface (UI), such as a graphical user interface (GUI) 56 on a display device 58 of the navigation system, such as an LCD navigation screen and/or spoken directions on an audible device. The driver (or someone else in the vehicle) interacts with the navigation system 30, e.g., via the UI 56, to identify a user-selected destination, for example, by selecting a street address, name of a location, GPS coordinates, preset location (e.g., "home") or the like, e.g., by touching the navigation screen 58 or speaking into a microphone of a voice-to-text converter.

The instructions 54 include a satellite navigation component 60 configured to determine a current location of the vehicle 28 and identify a route for the driver to follow to reach the selected destination, based on inputs by the driver through the GUI, e.g., in the conventional manner. The navigation component 60 may access a geographic database, stored in memory 52 and/or remotely, which includes a geographic representation of the roads in the form of a road map vector database. The geographic database may further include speed limits along the roads, turn restrictions, road names, points of interest such as hotels, restaurants, gas stations, parks, large parking places, and airports. Since navigation systems of this type are well known, further details are not provided.

The exemplary instructions 54 further include a parking space location component 62 for discovering the closest place to park. The GUI 56 is configured for displaying a "find parking" actuator 64 which allows the driver to activate the parking space location component 62. The actuator 64 may include an icon associated with a touch actuable area of the screen 58. In other embodiments, the "find parking" mode may be voice actuated by speaking into a microphone of a voice-to-text converter.

The second communication device 26 includes an antenna 66 for sending and receiving short range wireless signals 32 to/from first communication devices 22, 24, etc. that are proximate the vehicle 28, e.g., within approximately 100 meters, or 50 meters, or less. In this way, the second communication device 26 is generally within communication range of at most about one of the first communication devices 22, 24. For example, in FIG. 1, the second communication device 26 is in communication range with the closest, first communication device 22, but not within communication range of the next closest first communication device 24.

A parking availability information component 68 receives parking availability information 25 that the second communication device 26 acquires from a TVM 10 as the SNS passes by and stores the information in memory 52 of the navigation system 30. The parking availability information component 68 also retrieves the parking availability information 25 from memory 52 that the system has acquired from an earlier TVM on the route 70. The component 68 causes this retrieved information 25 to be sent by the second communication device 26 to the TVM 10. Information 25 acquired by the parking availability information component 68 from the current TVM, optionally together with information 25 previously and/or subsequently acquired from one or more other TVMs, is used by the parking space location component to identify a closest parking zone 15 to the selected destination where an available parking space 18 is predicted to be found. The location of the identified parking zone, is used by the satellite navigation component 62 to propose a new route to the identified parking zone 15.

The actuator 64, parking space location component 62, parking availability information component 68 and second communication device 26 together provide a functionality that allows the driver to select a parking space location mode ("find a closest place to park") of the navigation system 30.

Hardware components 26, 50, 52, 58, of the navigation system 30 are communicatively linked by a bus 72 and/or wired or wireless links 74 and an input/output (I/O) device 76.

Figure 3:
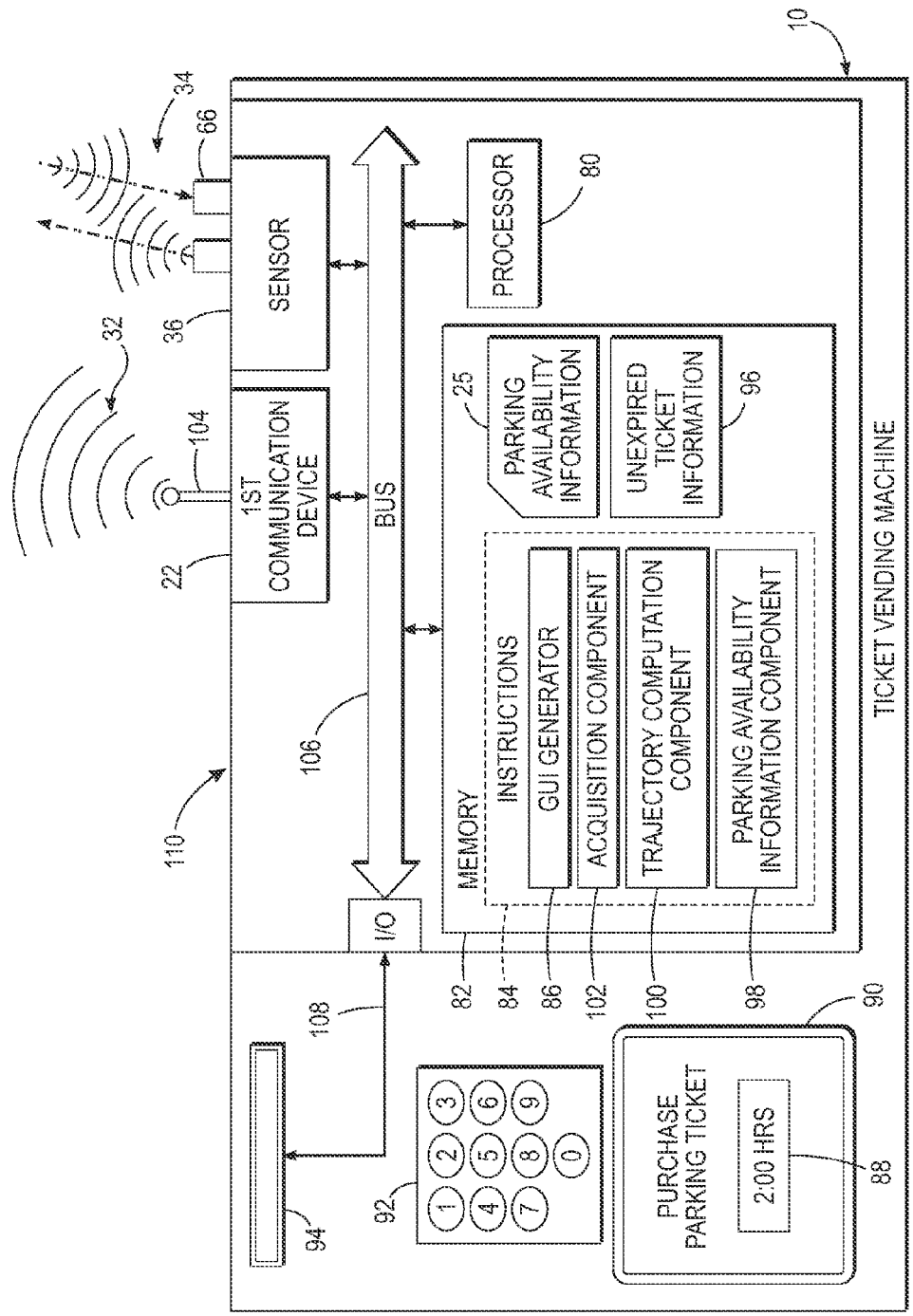
FIG. 3 is a functional block diagram of ticket vending machine in the parking assist system of FIG. 1.

With reference also to FIG. 3, the exemplary ticket vending machines 10, 12 of the transportation network, which may be similarly configured, include a processor 80, and associated memory 82 which stores instructions 84, executed by the processor. The instructions include a GUI generator 86 for generating a graphical user interface (GUI) 88 on a display device 90 of the vending machine, such as an LCD screen. The driver interacts with the ticket vending machine, via the GUI 88 and/or an associated keypad 92 to select a time period, for example, a number of minutes/hours that the driver plans to park in an empty parking space 18. The driver pays for or otherwise obtains a right for use of the allocated time, e.g., using a credit card reader 94, currency slot, parking permit reader, or the like, and may be issued a ticket which is displayed in the vehicle or carried by the driver. Information 96 about the time allocated on each ticket and a timestamp corresponding to when the ticket was issued is stored in memory 82 until the ticket has expired at the end of the time allocated.

The instructions 84 also include a parking space availability computation component 98, a trajectory computation component 100 and an acquisition component 102. The parking space availability computation component 98 estimates at a given time, the number of spaces that are likely to be available in the set of parking spaces associated with the respective TVM based on the information 96, and stores this information with the timestamps as parking space availability information 25 in memory 82. The trajectory computation component 100 computes the likely trajectory of the vehicle, based on inputs from the sensor 36 or based on the user-selected destination. The trajectory computation component 100 identifies close TVMs along part of route 70 that are identified based on the trajectory. The acquisition component 102 acquires parking availability information for other TVMs from the passing SNSs 36 and stores it in memory as parking availability information. The acquisition component 102 provides the first communication device 22 with parking availability information 25 previously acquired from those local TVMs 12, e.g., acquired from a second vehicle 37 traveling in an opposite direction along the street to be transmitted to the current vehicle 28. The collected information 25 which is passed to the SNS of the passing vehicle 28 thus includes information generated by component 98 for the respective zone 15 as well as information acquired for other zones 35, generated by other TVMs in a similar manner. In some embodiments, the TVM 10, 12 simply transmits all the most current information acquired from the passing SNSs without selecting the most relevant.

Hardware components 80, 82, 22, 36, 90, 92, 94 of the TVM 10, 12 are communicatively linked by a bus 106 and/or wired or wireless links 108.

The exemplary TVMs 10, 12 are able to communicate parking availability information 25 that includes not only the predicted availability of parking spaces in the respective set of parking spaces associated with the TVM, but also the predicted availability of parking spaces in a respective set of parking spaces associated with other local TVMs and thereby propagate parking space availability information generated by one TVM to other, more remote TVMs, e.g., using the passing vehicles 28 as propagators.

The TVMs are generally self-contained units, each including a housing 110 in which the respective processor 50 and memory 52 are contained and/or are supported by the housing. Display 90, user input device 92, and payment/allocation mechanism 94 may be mounted in and/or on the housing 110.

The SNSs 30 may also be self-contained units, each including a housing 112 in which the processor 80 and memory 82 are contained and/or supported by. Display 58, and its user input may be mounted in and/or on the housing 112. In other embodiments, the SNS may be integrated into the body of the vehicle, with components distributed throughout the dashboard, for example.

In the TVMs 10, 12 and SNS 30, the respective memory 82, 52 may represent any type of non-transitory computer readable medium such as random access memory (RAM), read only memory (ROM), magnetic disk or tape, optical disk, flash memory, or holographic memory. In one embodiment, the memory each 82, 52 comprises a combination of random access memory and read only memory. In some embodiments, the respective processor 80, 50 and memory 82, 52 may be combined in a single chip.

The digital processors 80, 50 can each be variously embodied, such as by a single-core processor, a dual-core processor (or more generally by a multiple-core processor), a digital processor and cooperating math coprocessor, a digital controller, or the like. The digital processor 80, 50, in addition to controlling the operation of the respective computer-implemented devices 30, executes instructions stored in memory 28 for performing the method outlined in FIGS. 4 and/or 5.

The term "software," as used herein, is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

As will be appreciated, FIGS. 2 and 3 are high level functional block diagrams of only a portion of the components which are incorporated into a respective computer-implemented device 10, 26. Since the configuration and operation of programmable computers are well known, they will not be described further.

Figure 4:
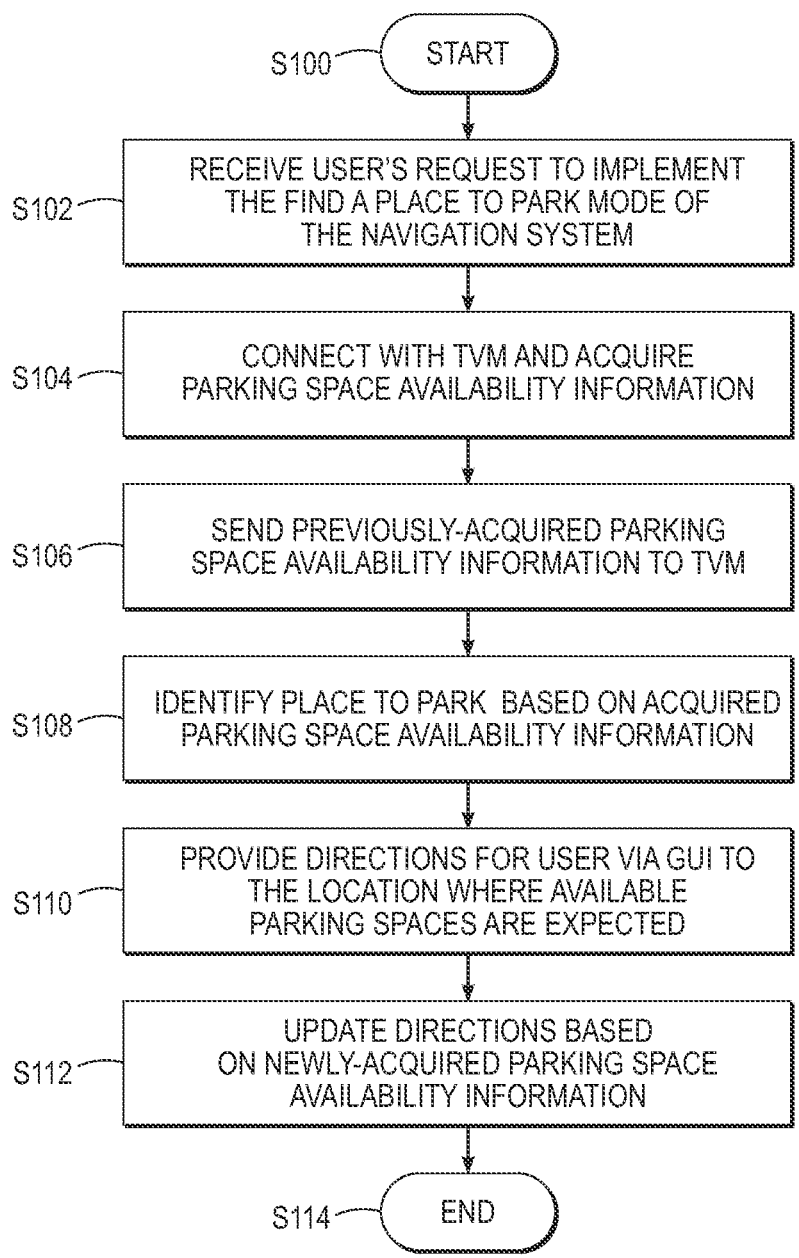
FIG. 4 is a flow chart of a method for locating an available parking space in accordance with another aspect of the exemplary embodiment.

FIG. 4 illustrates an exemplary method for locating an available parking space which can be performed with the system illustrated in FIGS. 1-3, from the perspective of the SNS. The method begins at S100.

At S102, a navigation system in a moving vehicle, which is programmed to guide the driver to a selected destination, receives a user's request to implement a mode of the navigation system for locating a place to park. The navigation system 30 waits until the vehicle is close to the selected destination before implementing the request.

At S104, while the driver of the vehicle is being guided by the navigation component 60 towards the user-selected destination, e.g., as the vehicle is getting close to the destination, the second communication device 26 of the SNS 30 connects with one or more TVMs 10, 12 on the route to collect parking availability information 25. The information acquired from a given TVM may include both information about any available spaces in the current street, but also on the remaining streets along the route that the SNS has selected to get the driver to the selected destination, and optionally also on streets that are close to the selected route. At S106, the SNS communicates parking availability information 25 it has previously acquired from another TVM it has passed along the route on its way to the TVM that it is currently passing. Receipt and transfer of information 25 is controlled by the parking availability information component 68.

At S108, from the information 25 acquired from the TVMs at S104, the SNS parking space location component 62 may select one of the at least one second parking zones 15, based on the user-selected destination and acquired parking availability information. The aim is to identify a close or closest parking zone 15 to the selected destination where it predicts that the user will be able to find an available space 18 to park. The coordinates of the identified parking zone 15 are passed to the satellite navigation component 60 for identifying a modified route 70.

At S110, the driver is provided, via the GUI 56, with directions to the identified zone 15, nearest to the selected destination, where parking spaces are expected to be found. The driver may be alerted that the route has been modified, if for example, there is no predicted availability of parking spaces on the street where the destination is located.

At S112, as the driver follows the route to the identified parking location, the SNS 30 may continue to receive updates from TVMs 12 that it passes. For example, if there is a change in the availability of parking spaces in the parking zone to which the driver is being directed, the component 68 may receive and store the updated information. If no or few parking spaces are expected to be available, based on the updated information 25, a new parking zone location may be computed by component 62, which is close to the selected destination, where the user is expected to be able to find an available space to park. The coordinates of the new identified parking zone 15 are passed to the satellite navigation component 60 for identifying a new modified route 70, which is displayed on the GUI.

The method ends at S114.

Figure 5:
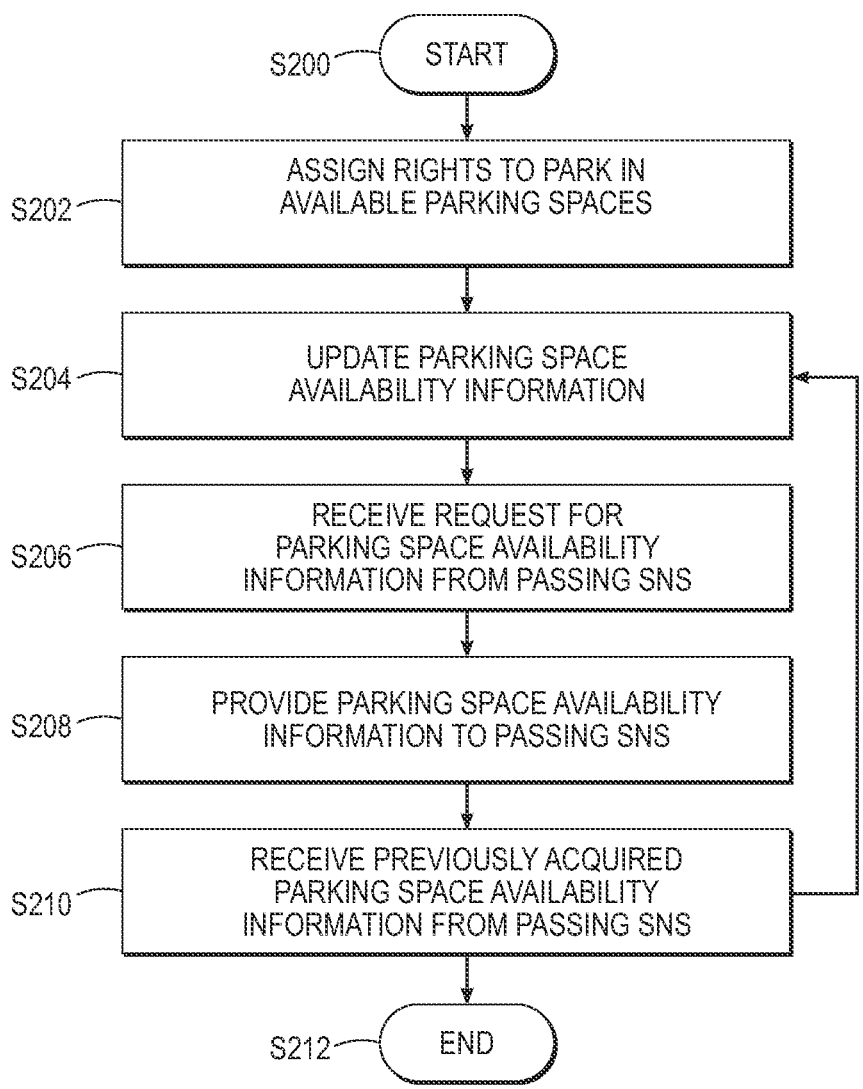
FIG. 5 is a flow chart of a method for locating an available parking space in accordance with another aspect of the exemplary embodiment.

FIG. 5 illustrates an exemplary method for locating an available parking space which can be performed with the system illustrated in FIGS. 1-3, from the perspective of one of the TVMs 10, by way of example. The method begins at S200.

At S202, the TVM 10 receives requests from drivers to park in any one of the available parking spaces in its parking zone and the TVM assigns each driver the right to park for a fixed period of time.

At S204, each time a parking space is allocated, parking space availability information 25 is updated and stored in memory 82. Alternatively, the information may be updated only when a request for information 25 is received by a passing SNS 30.

At S206, the TVM receives a request for information 25 from the SNS 30 of a passing vehicle 26 (output at S104).

At S208, the TVM communicates its own parking availability information 25 with the SNS as well as information 25 that it has acquired from a prior SNS that has passed along the route to the TVM in an opposite direction.

At S210, the TVM 12 receives previously acquired information 25 from the SNS. The method may return to S204, where the information 25 previously stored in memory 82 is updated, based on the timestamp of the information received.

The method ends at S212.

The method illustrated in FIGS. 4 and 5 may be implemented in a respective computer program product that may be executed on a computer. The computer program product may comprise a non-transitory computer-readable recording medium on which a control program is recorded (stored), such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other non-transitory medium from which a computer can read and use. The computer program product may be integral with the respective computer-implemented device 30, 10, (for example, an internal hard drive of RAM), or may be separate (for example, an external hard drive or disk operatively connected with the device 30, 10), or may be separate and accessed via a digital data network such as a wide area network, such as the Internet (for example, as a redundant array of inexpensive of independent disks (RAID) or other network server storage that is indirectly accessed by the computer-implemented device 30, 10, via a digital network).

Alternatively, the method may be implemented in transitory media, such as a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any devices, capable of implementing a finite state machine that is in turn capable of implementing the flowchart shown in FIGS. 4 and 5, can be used to implement the method. As will be appreciated, while the steps of the method may all be computer implemented, in some embodiments one or more of the steps may be at least partially performed manually.

As will be appreciated, the steps of the method need not all proceed in the order illustrated and fewer, more, or different steps may be performed.

Further details of the system and method are now provided.

For a given TVM 10, 12, an estimate can be made of the number of available spaces on surrounding streets (covered by other TVMs). One way to make such an estimate is to connect all the TVMs of a geographic region, using a wired or wireless network. In an exemplary embodiment, however, propagation is used. In this embodiment, an SNS passing near a given TVM collects the parking space availability data and transmits the data it has collected while passing near other TVMs.

Viewed from the SNS side, in one example embodiment:
1) The driver of a vehicle 28 enters the exact coordinates of the selected destination in his SNS 30 using the GUI 56.
2) The satellite navigation component 60 of the SNS 30 computes a route from the current location to the selected destination, as a standard navigation system does.
3) The driver of the vehicle 28 actuates the find a place to park mode 64 of the SNS 30 using the GUI 56 (S102).
4) While traveling, when the car reaches (or gets close to) the selected destination, the SNS tries to establish a wireless connection with one TVM 10 as the car passes by (S104). If the connection is established:
   a. The SNS collects information 25 from the TVM 10 including:
      i. the estimated number of available spaces in the street covered by the TVM,
      ii. the likelihood of there being available spaces at the current time, and
      iii. the same status (availability plus likelihood) from TVMs 12 nearby (with the latest update timestamp).
   b. If the SNS has passed near one or more other TVMs in the recent past (for example, within the latest 5 or 10 minutes, depending on the expectation of how soon the information will become outdated), then it transfers all the information 25 collected from these TVMs to the current TVM, so that the TVM can update its own knowledge of available spaces in nearby parking zones (S106).
   c. Based on the acquired information 25, the SNS systems has two options at S108:
      i. If, from the gathered information 25, it has enough data (that is fresh enough) to estimate how many spaces are available in streets between the current location and the selected destination, then it computes a route from the current location to the street that contains available spaces closest to the destination,
      ii. If there is not enough information (e.g., the status around the destination is unknown or the information 25 is determined to be outdated) then the SNS maintains the initially planned route until further information 25 is acquired along the route.
   d. Optionally, when the car stops and parks on a street, the SNS 30 sends information that it is occupying an available space in that zone to the closest TVM so that the status of available spaces is updated. When the car leaves the space, the SNS may send information that the vehicle is leaving to the TVM so the status can be again updated.
5) If the car reaches the destination without having found an available space, the SNS may propose to "circle around" by proposing a route to the closest TVM that has the highest likelihood to have available spaces at the current time hoping to get updates about available spaces in the meantime.

Viewed from the TVM side, in order to provide parking space availability information 25, each TVM is able to estimate, at given time, the number of available spaces in its parking zone or provide sufficient information 25 from which an estimate can be computed by the SNS 30 receiving the information.

In some embodiments, each parking space 16, 18 is associated with a vehicle detection sensor (not shown), that detect parked cars to determine whether the parking space is occupied or not and reports the determination. The vehicle detection sensors communicate with the associated ticket vending machine, or to an interconnected computer, which computes the number of available parking spaces based on the reports of the sensors. However, parking sensors can be unreliable or inoperative at times, leading to inaccurate or no reports. The estimate of available spaces may take into account such inaccuracies. See, for example, above-mentioned U.S. Pub. No. 20130262059, incorporated by reference. Another method is to place cameras adjacent the parking spaces with appropriate software which recognizes that the parking space is occupied. Parking space availability information is acquired from the cameras or an associated computer with software for recognizing parked vehicles. However, placing sensors on the street to detect parked cars or placing cameras combined with the appropriate system that detects, from acquired images, empty spaces on the street can be costly to install.

Thus, in the exemplary embodiment, the parking space availability relies on an estimate of the occupied parking spaces that is based on the parking tickets that have been issued, rather than on direct information of occupancy. In particular, the TVM 10, 12 does not receive information as to which parking space has been occupied by a given vehicle or that corresponds to a given ticket and also does not receive information as to the time at which the parked vehicle/ticket leaves the parking zone and a parking space becomes vacant. Particularly in the case on on-street parking, the driver simply leaves the parking space at some time after he has parked and does not have the issued parking ticket canceled by the TVM or an associated device.

Given a known, finite number of parking spaces in the respective set of parking spaces 16, 18, and the times at which drivers have paid for or otherwise obtained parking rights and the length of parking time allocated, an estimate of the number of available (unoccupied) parking spaces at a given time can be made by the parking space availability computation component 98 of a TVM 10, 12. There are several methods for component 98 to estimate the number of currently available spaces in the street(s). In one embodiment, the estimate of available parking spaces assumes that each vehicle occupies a parking space for the entire time allocated. In other embodiments, the estimate assumes that at least some of the vehicles each occupy a parking space 16 for less than the time allocated, such that a probability of a parking space being occupied is computed as a function of the allocated time and a flexibility parameter, such as 10% or 20% of the parking spaces allocated are not occupied. Other methods for estimating the number of available parking spaces are also contemplated, for example, by assuming that the occupied time is a function of a probability distribution, such as a Gaussian distribution.

In one embodiment, the number of available parking spaces is computed as follows:

Let T be the total number of parking spaces 16, 18 that are managed by the TVM 10. This is typically the parking spaces that are near to the TVM. If the TVM is in the middle of a street and if there is another TVM on the opposite side, then the managed places T are typically those located on the same side of the street as the TVM. If the TVM is at a crossroad, then T may be all surrounding places that are located closer to the TVM than to the next TVM.

Let M be the number of tickets sold that are still valid (unexpired parking tickets where time of sale+time bought is less than current time of timestamp).

Let Z be the flexibility parameter. This accounts for the fact that the computation component 98 does not have exact information regarding occupancy. In one embodiment the flexibility parameter may be 10%. Thus, for example, if a parking space is paid for at time t and the driver has paid for 2 hours, rather than assuming that the space will remain occupied for 2 hours, it may be assumed that the parking space will be unoccupied at t+1.8 hours.

At a given time when the first SNS 30 asks the first TVM 10 if there are available places, the TVM can use the following rules to estimate whether there are any available places in its zone 15:

If M<T then the TVM responds: YES.

If M=T+(T×Z), then the TVM answers: POSSIBLY (or NO).

If M>T+(T×Z), then the TVM answers: NO

As will be appreciated, similar rules are used by the second TVM 12 to compute whether there are available parking spaces in the second parking zone 35 at the time the second TVM is asked for availability information by the second SNS 36. This information is relayed by the second SNS to the first TVM 10, which is provided to the first SNS 30. The navigation system may then identify a closest second parking zone 35 to the selected destination that has availability (a YES) or if none is within a threshold walking distance or otherwise computed range of the destination, may identify a parking zone for which the TVM has indicated there is possibly availability.

The method may be modified to offer more flexibility. Instead of providing a ternary answer (one of YES, POSSIBLY, and NO), or a binary answer (one of YES and NO), which is simple for the SNS to employ, the system may additionally or alternatively return the likelihood L to have an available parking space, which may be computed as follows:

$$L=((T-M)/T)$$

In this case, instead of having discrete values to make the decision, the first SNS 30 receives a likelihood L for each parking zone 15, 35. The SNS 30 may plan a route to an identified zone that is closest to the destination and/or that has the greatest likelihood L. The definition of how close to the destination the identified zone should be to be considered may be specified by the navigation system and/or may be selectable by the user. In one embodiment, the navigation system may identify the closest parking zone to the destination for which there is at least a threshold likelihood L unless, for example, there is no parking zone within a threshold range of the selected destination, in which case, a parking zone below the threshold may be used or the navigation system may proceed to guide the driver to the selected destination and search from the closest TVM to more distant ones.

In one embodiment, the TVM 10, 12 component 98 is configured for computing the mean likelihood to have available spaces (LTAS at a specific time in the day. To do so, it can use the following method:

Every time increment, such as every 5 minutes (the time increment can be increased for times of day with a lower variability), the TVM:

1. computes an Available Space Estimate (ASE)=T−M.
2. records a tag (Day+Current time+ASE)
3. for the N−1 latest tags with the same Day+Current Time (e.g., within the past 60 minutes), computes the mean value (MVCT) as:

$$MVCT = \frac{\left(ASE + \sum_{i=1}^{N-1} ASE_i\right)}{N}$$

4. computes the likelihood to have available places (LTAS) at a specific time as:

$$LTAS = \frac{MVCT}{T}$$

5. record the LTAS value for the current time.

When a SNS 30 passes near the first TVM 10 and requests data 25, then the first TVM communicates the information about available places and optionally the LTAS value for the current time for its location, as well as corresponding information acquired from second TVMs 12. The LTAS is useful in the case when the TVM 10 has not recently received parking availability information from other passing vehicles 37 for one of the other TVMs 12 which may be of relevance to the driver of the current vehicle 28. Given the LTAS, an estimate of the availability can be computed, even though recent information is not available.

In other embodiments, the SNS may receive the number T from the TVM or from a remote server which is supplied with the information T for each TVM, in advance, since this number changes only rarely. The SNS may receive the number M from the TVM 10, and optionally the LTAP, and use its own software 54 for determining whether there is at least a threshold probability of a given parking zone having available parking spaces, based on T, M, optionally LTAS, and optionally a flexibility parameter Z. Flexibility parameter Z may be selected by the component 62 and may vary according to one or more of the time of day, vehicle speed, distance to the parking zone for which the value M is provided, and/or other factors. In another embodiment provision may be made for the flexibility parameter Z to be selected or modified by the driver.

Figure 6:
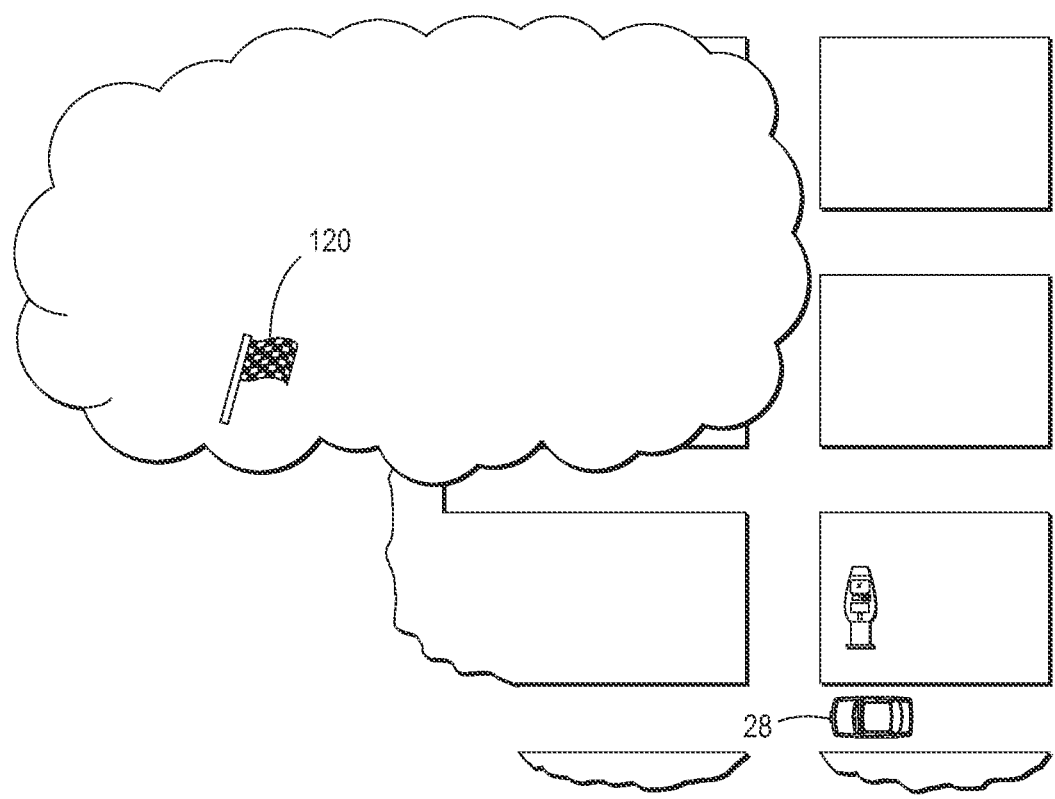
FIG. 6 graphically illustrates a first stage in location of an available parking space in the exemplary method.
Figure 7:
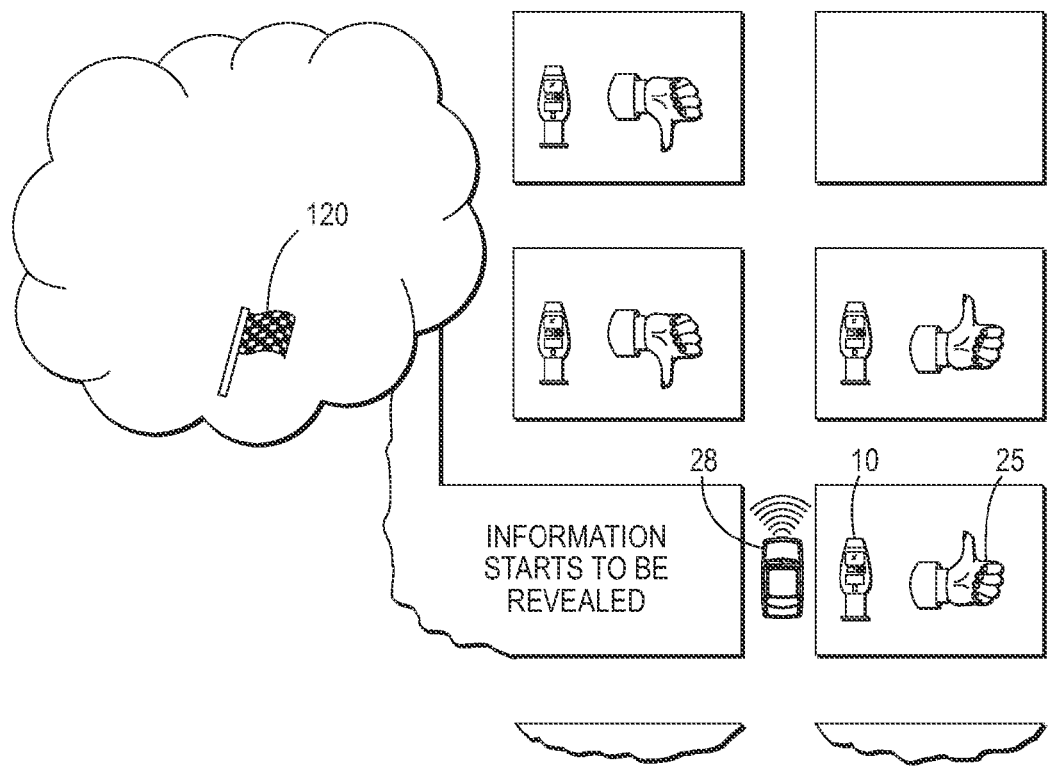
FIG. 7 graphically illustrates a second stage in location of an available parking space in the exemplary method.
Figure 8:
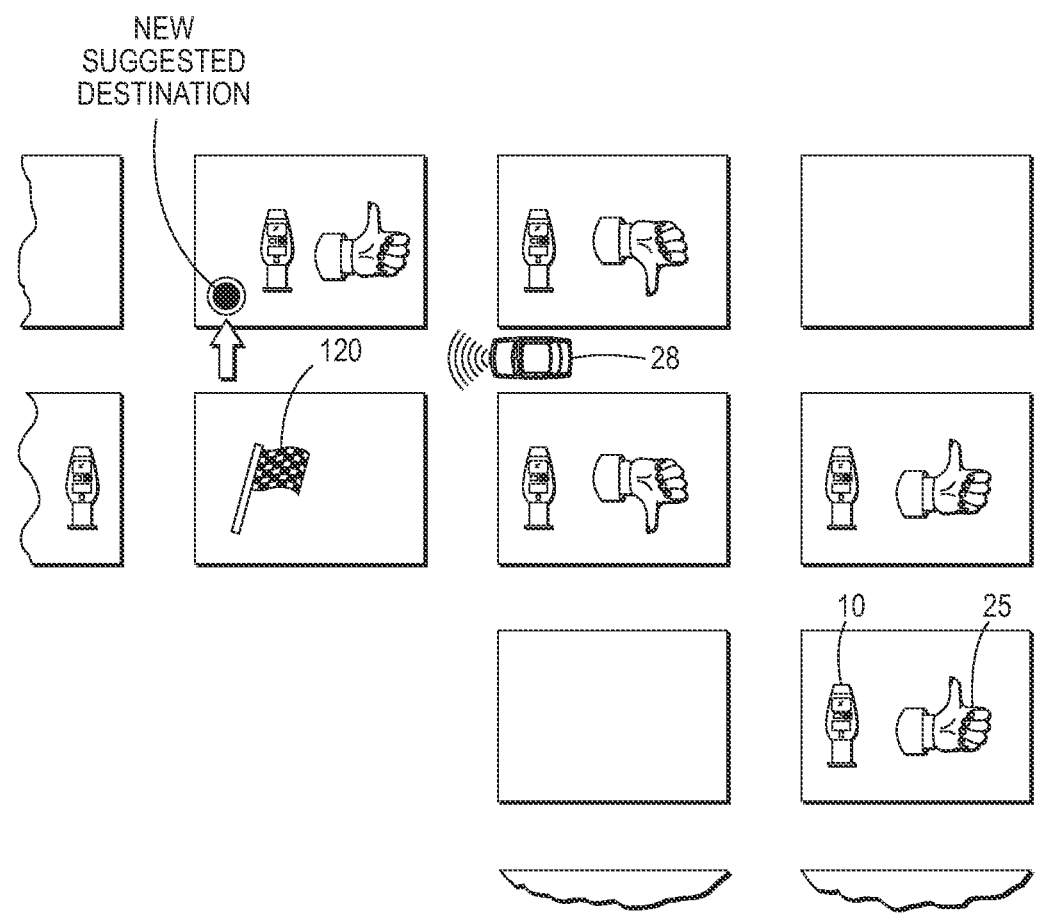
FIG. 8 graphically illustrates a third stage in location of an available parking space in the exemplary method.

FIGS. 6-8 provide a graphical illustration of how the parking assist system may operate. In FIG. 6, the vehicle 28 is approaching, but still fairly remote from the selected destination 120. At this point, parking availability information for parking zones 15 near the destination is unknown to the SNS or expected to be inaccurate for the time when the driver will arrive, as illustrated by the cloud. As the vehicle 28 gets closer to the selected destination 120 (FIG. 7), it passes at least one TVM 10 and the SNS begins to collect information from TVMs along the route. There may still be some uncertainty about the parking space availability in zones near the destination 120. When the SNS has sufficient information for the parking space location component 62 to identify a zone where there is a computed threshold probability of there being an available parking space when the driver arrives.

The navigation system may also embed Key Interest Point (KIP) information, such as large parking locations, which may be displayed on the navigation screen so that the user can decide to go there, in place of the proposed parking zone. The navigation system may also provide wireless capability so that it can receive traffic and other information, such space availabilities in these large parking locations.

The exemplary parking assist system combines the following elements:

a way for the SNS to communicate with TVMs to obtain information for estimation of where available spaces can be found, a TVM that estimates the number of available spaces and communicates with SNSs, the spreading of information exchanged between TVMs and SNSs passing by.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method for assisting a driver to locate a parking space, comprising:
   identifying a user-selected destination, with a first navigation system of a first vehicle;
   acquiring parking availability information from a first space allocation device associated with a first parking zone, while a driver of the first vehicle is being guided by the first navigation system towards the user-selected destination, with a communication device which is integral with or associated with the first navigation system, the parking availability information including second parking availability information for at least one second parking zone associated with a respective second space allocation device that is spaced from the first space allocation device, wherein the second parking availability information for the at least one second parking zone is acquired from the respective second space allocation device by at least one communication device integral with or associated with a second navigation system of a respective second vehicle when the communication device of the second vehicle is in communication range of the second space allocation device but not within communication range of the first space allocation device, the second parking availability information being communicated to the first space allocation device by the at least one second navigation system of the respective second vehicle when the second vehicle communication device is in communication range of the first space allocation device but not in communication range of the second space allocation device; and
   selecting, with a processor, one of the at least one second parking zones based on the user-selected destination and acquired parking availability information.

2. The method of claim 1, further comprising, with the navigation system, proposing a route to the selected one of the at least one second parking zones.

3. The method of claim 1, wherein the selected one of the at least one second parking zones is closer to the user-selected destination than the first space allocation device.

4. The method of claim 1, wherein the selected one of the at least one second parking zones is predicted, based on the acquired parking availability information, to have an available parking space.

5. The method of claim 1, further comprising providing parking availability information to the first space allocation device that is acquired by the first navigation system from a third space allocation device.

6. The method of claim 1, wherein the second parking availability information for the at least one second parking zone includes an estimate of a number of available parking spaces in each of the at least one second parking zone.

7. The method of claim 6, wherein the estimate of the number of available parking spaces is based on a flexibility parameter which accounts for a probability that a parked vehicle leaves a respective parking space before an issued parking ticket expires.

8. The method of claim 1, wherein the second parking availability information for the at least one second parking zone includes a number of unexpired parking tickets issued at a time when the second parking availability information in each of the at least one second parking zone was acquired, or information based on the number of unexpired parking tickets issued at the time when the second parking availability information in each of the at least one second parking zone was acquired.

9. The method of claim 1, wherein the second parking availability information for the at least one second parking zone includes an estimate of whether there are available parking spaces in each of the at least one second parking zone.

10. The method of claim 1, further comprising providing parking availability information acquired by the first navigation system from a third space allocation device to the first space allocation device.

11. The method of claim 1, wherein each of the at least one second parking zone includes a plurality of parking spaces.

12. The method of claim 1, further comprising providing a user interface in which a user selects a mode of the navigation system for finding a parking space.

13. The method of claim 1, wherein the second parking availability information includes a timestamp at which the information was acquired by the second space allocation device.

14. The method of claim 1, wherein the parking availability information includes a likelihood for the second parking zone to have available places which is based on a plurality of estimates of availability at different timestamps.

15. The method of claim 1, wherein the first and second space allocation devices comprise parking ticket vending machines.

16. A navigation system comprising memory which stores instructions for performing the method of claim 1 and a processor in communication with the memory for executing the instructions.

17. The navigation system of claim 16, further comprising a graphical user interface configured for user actuation of a mode in which the navigation system is requested to find a place to park.

18. A navigation system for a first vehicle comprising:
   a navigation component which identifies a route for the first vehicle to a user-selected destination;
   a parking availability information component which acquires parking availability information from a first space allocation device associated with a first parking zone, the parking availability information including second parking availability information for at least one second parking zone associated with a respective second space allocation device that is spaced from the first space allocation device, wherein the second parking availability information for the at least one second parking zone is acquired from the second space allocation device by at least one second navigation system of a respective second vehicle traveling in an opposite direction to the first vehicle and communicated to the first space allocation device by the at least one second navigation system when in communication range of the first space allocation device;
   a parking space location component which identifies a parking zone to park, based on the acquired parking availability information and the user-selected destination; and
   wherein the navigation component is configured for identifying a route to the identified parking zone; and
   a processor which implements the navigation component, parking availability information component, and parking space location component.

19. The navigation system of claim 18, further comprising a user interface in communication with the navigation component which assists a user in selecting the user-selected destination.

20. A ticket vending machine comprising:
- a mechanism for authorizing use of parking spaces in an associated first parking zone to vehicles for a predetermined time period;
- memory which stores for a plurality of the parking spaces, information on the time at which one of the parking spaces in the first zone is allocated and the length of time allocated;
- a parking space computation component which generates first parking availability information for the first parking zone based on the stored information on the time when one of the parking spaces in the first zone is allocated, the length of time allocated, and the current time;
- a first communication device which receives second parking availability information from a first passing vehicle for at least one second parking zone and transmits the second parking availability information to a second passing vehicle;
- an acquisition component which acquires the second parking availability information from the first communication device for the at least one second parking zone and stores it in memory, the second parking availability information for the at least one second parking zone having been communicated to the first communication device of the ticket vending machine by a second communication device of the first passing vehicle; and
- the first communication device configured for transmitting the first and second parking availability information to a second communication device of the second passing vehicle, when the second vehicle is within communication range of the first communication device, for enabling identifying a route to a parking zone based at least in part on the second parking availability information; and
- a processor which implements the acquisition component and parking space computation component.

* * * * *